US012422296B2

(12) United States Patent
Casson et al.

(10) Patent No.: US 12,422,296 B2
(45) Date of Patent: Sep. 23, 2025

(54) LINE-OF-SIGHT SENSOR MOUNTING SYSTEM AND METHOD

(71) Applicant: TROO Corporation, Ottawa (CA)

(72) Inventors: Perry Casson, Regina (CA); Braden Wyatt, Ottawa (CA); Luc Boucher, Ottawa (CA); Rick Casson, Saskatoon (CA); John Tutton, Manotick (CA); Torrin Mullins, Ottawa (CA)

(73) Assignee: TROO CORPORATION, Ottawa (CA)

( * ) Notice: Subject to any disclaimer, the term of this patent is extended or adjusted under 35 U.S.C. 154(b) by 342 days.

(21) Appl. No.: 18/260,931

(22) PCT Filed: Sep. 29, 2021

(86) PCT No.: PCT/CA2021/051353
§ 371 (c)(1),
(2) Date: Jul. 10, 2023

(87) PCT Pub. No.: WO2022/147607
PCT Pub. Date: Jul. 14, 2022

(65) Prior Publication Data
US 2024/0060811 A1 Feb. 22, 2024

Related U.S. Application Data

(60) Provisional application No. 63/135,986, filed on Jan. 11, 2021.

(51) Int. Cl.
G01F 23/292 (2006.01)
A01D 41/127 (2006.01)
G01V 8/18 (2006.01)

(52) U.S. Cl.
CPC ..... *G01F 23/2921* (2013.01); *A01D 41/1272* (2013.01); *G01V 8/18* (2013.01)

(58) Field of Classification Search
CPC ........ G01F 23/2921; G01V 8/12; G01V 8/18; A01D 41/1272
See application file for complete search history.

(56) References Cited

U.S. PATENT DOCUMENTS 3,535,539 A * 10/1970 Pearson ................... G01V 8/12
356/219
3,553,471 A * 1/1971 Maigret ................... G05D 9/12
340/617

(Continued)

FOREIGN PATENT DOCUMENTS

GB 2088808 A 6/1982
JP 2017134917 A 8/2017

OTHER PUBLICATIONS

Extended European Search Report dated Nov. 14, 2024 in European Patent Application No. 21916683.2, 8 pages.

*Primary Examiner* — John Fitzgerald
(74) *Attorney, Agent, or Firm* — Gray Ice Higdon

(57) ABSTRACT

Described are various embodiments of a line-of-sight (LoS) sensor mounting system and method. In one such embodiment, a LoS sensor mounting system is described for operatively mounting a LoS receiver and LoS transmitter on a structure having opposed external walls, comprising a mounting plate and an alignment jig comprising a mounting plate engagement structure and an alignment barrel dimensioned. The alignment barrel is dimensioned to receive an aperture-forming tool operable therethrough along a LoS axis so to form a counterpart external wall LoS aperture within an opposed external wall.

23 Claims, 15 Drawing Sheets

(56) References Cited

U.S. PATENT DOCUMENTS

| | | | |
|---|---|---|---|
| 4,517,792 A | | 5/1985 | Denning et al. |
| 6,918,237 B2 | | 7/2005 | Shidler et al. |
| 9,188,481 B2 | * | 11/2015 | Baumatz ................. G01S 17/87 |
| 9,345,189 B2 | | 5/2016 | Harmelink et al. |
| 9,913,426 B2 | | 3/2018 | Noll |
| 10,091,933 B2 | * | 10/2018 | Koch ....................... G01B 5/14 |
| 2004/0208272 A1 | * | 10/2004 | Moursund .......... H04B 10/1123 |
| | | | 375/356 |
| 2010/0074622 A1 | * | 3/2010 | Damink ............... G08B 13/183 |
| | | | 398/78 |
| 2019/0141893 A1 | | 5/2019 | Vandike et al. |
| 2020/0264025 A1 | | 8/2020 | Strnad et al. |

\* cited by examiner

LINE-OF-SIGHT SENSOR MOUNTING SYSTEM AND METHOD

CROSS REFERENCE TO RELATED APPLICATIONS

This application claims priority to U.S. Provisional Application No. 63/135,986 filed Jan. 11, 2021, the entire disclosure of which is hereby incorporated herein by reference.

FIELD OF THE DISCLOSURE

The present disclosure relates to line-of-sight sensor systems, and, in particular, to line-of-sight sensor mounting systems and methods.

BACKGROUND

Line-of-sight sensor systems are generally known in the art to include a transmitter and receiver, generally operating in the optical spectrum such as in the infrared (IR) range, to form an optical line of sight that, upon being obstructed, can trigger a corresponding measure or control response. For example, obstruction of the line of sight in a mechanical closure system can trigger a safety measure to stop or reverse a closure motion.

A similar installation can be used to measure a volumetric or discrete quantity of material being transported through the line of sight, for example, by characterizing a time-variable shadowing produced within the line of sight over time as the material is transported. One such example can be found in the volumetric measurement of grain being transported by a grain elevator, such as that provided on a combine harvester. In one particular configuration, an optical transmitter-receiver pair is disposed on either side of the grain elevator in optical alignment with corresponding line-of-sight apertures formed in the opposed grain elevator walls so to monitor a calibrated grain volume being transported by each elevator paddle. Namely, as the line of sight is sequentially obstructed for an amount of time proportional to the amount of grain on each paddle given a known or measured grain elevator speed, computation of a grain volume being transported by the elevator over time can be resolved.

However, installation of a line of sight sensor system on a grain elevator, or other agricultural or industrial equipment, for example, can be challenging as physical access to certain parts of the equipment can be limited or outright obstructed such that effective or accurate alignment or installation may be significantly impeded. Indeed, equipment geometries, space constraints, moving belts, etc. can make installations challenging, routinely requiring customized approaches and components.

Indeed, current aftermarket yield monitors are typically mounted using a custom bracket that is riveted or welded to the side of a clean grain elevator with a slot to hold the optical sensors in place. To have sensors aligned directly opposite one another on the grain elevator, the holes for the optical sensor and bracket rivets on the back side of the elevator must be done accurately. However, accessing between the body of the combine and the grain elevator can be extremely challenging on certain models of combine where there is only a few inches of space available for drilling or riveting. In these cases, a right angle drill is required. Yet, models will also have belts or tensioner rods directly in the way of the only available place to mount these brackets, further frustrating attempts to accurately position and mount yield sensor equipment.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a line-of-sight (LoS) sensor mounting system and method that overcome some of the drawbacks of known techniques, or at least, provides a useful alternative thereto. Some aspects of this disclosure provide examples of such systems and methods.

In accordance with one aspect, there is provided a line-of-sight (LoS) sensor mounting system for operatively mounting a LoS receiver and LoS transmitter on a structure having a first external wall and an opposed external wall, the system comprising: a mounting plate having a mounting plate LoS aperture defined therein dimensioned to correspond and align with a first external wall LoS aperture formed within the first external wall for secure mounting in relation thereto; an alignment jig comprising a mounting plate engagement structure and an alignment barrel extending therefrom to define a LoS axis between the first external wall and the opposed external wall; wherein said alignment barrel is dimensioned to receive an aperture-forming tool operable therethrough along said LoS axis so to form a counterpart external wall LoS aperture within the opposed external wall such that the LoS receiver and the LoS transmitter can be operatively mounted in alignment with the first external wall LoS aperture and the counterpart external wall LoS aperture for operation along said LoS axis.

In one embodiment, the mounting plate comprises a cooperative engagement structure for reversibly engaging said mounting plate engagement structure of said alignment jig to thereby secure said alignment barrel in relation thereto.

In one embodiment, the cooperative engagement structure is further configured for structural engagement with one of the LoS transmitter or the LoS receiver so to, upon removal of said alignment jig, operatively mount said one of the LoS transmitter or the LoS receiver in alignment with the first external wall LoS aperture.

In one embodiment, the system further comprises a transmitter mount structurally configured for cooperative engagement with said cooperative engagement structure of said mounting plate for structurally mounting the LoS transmitter to said mounting plate in alignment with said LoS axis.

In one embodiment, the transmitter mount cooperatively engages said cooperative engagement structure via a cooperative twist-lock structure.

In one embodiment, the transmitter mount is structurally configured for reversible cooperative engagement with said cooperative engagement structure of said mounting plate.

In one embodiment, once engaged to said mounting plate, and prior to operation of said aperture-forming tool, an inward extension of said alignment barrel aligns secure mounting of said mounting plate to the first external wall in alignment with said first external wall LoS aperture.

In one embodiment, the mounting plate is securable to the first external wall via an adhesive.

In one embodiment, the system further comprises a counterpart mounting plate having a counterpart mounting plate LoS aperture defined therein dimensioned to correspond and align with said counterpart external wall LoS aperture once formed.

In one embodiment, once engaged to said counterpart mounting plate, an inward extension of said alignment barrel aligns secure mounting of said counterpart mounting plate to the opposed external wall in alignment with said counterpart external wall LoS aperture.

In one embodiment, each of said mounting plate and said counterpart mounting plate comprises a cooperative engagement structure for reversibly engaging said mounting plate engagement structure of said alignment jig.

In one embodiment, each of said mounting plate and said counterpart mounting plate comprises a cooperative engagement structure for securely engaging a respective one of the LoS transmitter or the LoS receiver in operative alignment.

In one embodiment, the LoS transmitter is securely engageable to said mounting plate in alignment with said LoS axis, whereas the LoS receiver is securely engageable to said counterpart mounting plate for exposure to LoS transmissions along said LoS axis.

In one embodiment, the system further comprises a transmitter mount and a receiver mount, each structurally configured for cooperative engagement with said cooperative engagement structure to structurally secure the LoS transmitter and the LoS receiver thereto, respectively.

In one embodiment, the transmitter mount and said receiver mount cooperatively engage said cooperative engagement structure via a cooperative twist-lock structure.

In one embodiment, the first external wall and the opposed external wall define a material transfer channel, and wherein the LoS transmitter and the LoS receiver are operable to monitor a quantity of material transferred along said transfer channel.

In one embodiment, the material transfer channel comprises an agricultural harvest transport channel.

In one embodiment, the agricultural harvest transport channel comprises a harvested grain transport channel, and wherein said quantity comprises an agricultural yield.

In accordance with another aspect, there is provided a line-of-sight (LoS) sensor mounting method for operatively mounting a LoS receiver and LoS transmitter on a structure having a first external wall and an opposed external wall, the method comprising: securing a mounting plate having a mounting plate LoS aperture defined therein to the first external wall in alignment with a first LoS aperture; engaging an alignment jig with said mounting plate such that an alignment barrel thereof defines a LoS axis from the first LoS aperture; operating an aperture-forming tool through said alignment barrel along said axis to form a counterpart LoS aperture in the opposed external wall; disengaging said alignment jig from said mounting plate; and mounting the LoS transmitter and the LoS receiver in relation to said first LoS aperture and said counterpart LoS aperture in alignment with said LoS axis.

In one embodiment, the method further comprises disengaging said alignment jig from said mounting plate; and wherein one of the LoS transmitter or the LoS receiver is mounted via said mounting plate.

In one embodiment, prior to securing said mounting plate, the method further comprises forming the first LoS aperture in the first external wall.

In one embodiment, the alignment jig is engaged with said mounting plate prior to said securing so to guide alignment thereof with the first LoS aperture during said securing.

In one embodiment, after said disengaging, the method further comprises: engaging said alignment jig with a counterpart mounting plate; using guidance from said alignment jig, securing said counterpart mounting plate to the opposed external wall in alignment with said counterpart LoS aperture; and disengaging said alignment jig from said counterpart mounting plate; wherein the other one of the LoS receiver or the LoS transmitter is mounted via said counterpart mounting plate.

In one embodiment, the LoS transmitter is securely mounted relative to the first LoS aperture via said mounting plate, whereas the LoS receiver is securely mounted relative to the counterpart LoS aperture via said counterpart mounting plate.

In one embodiment, each of the LoS transmitter and the LoS receiver are securely mounted via a secure twist lock mechanism.

In one embodiment, the securing comprises adhering via an adhesive.

In accordance with another aspect, there is provided a line-of-sight (LoS) sensor mounting method for operatively mounting counterpart LoS sensor components on a structure having a first external wall and an opposed external wall, the method comprising: securing a mounting plate having a mounting plate LoS aperture defined therein to the first external wall in alignment with a first LoS aperture; engaging an alignment jig with said mounting plate such that an alignment barrel thereof defines a LoS axis from the first LoS aperture; operating an aperture-forming tool through said alignment barrel along said axis to form a counterpart LoS aperture in the opposed external wall; disengaging said alignment jig from said mounting plate; and mounting the counterpart LoS sensor components in relation to said first LoS aperture and said counterpart LoS aperture in alignment with said LoS axis.

In accordance with another aspect, there is provided a line-of-sight (LoS) sensor mounting system for operatively mounting counterpart LoS sensor components on a structure having a first external wall and an opposed external wall, the system comprising: a mounting plate having a mounting plate LoS aperture defined therein dimensioned to correspond and align with a first external wall LoS aperture formed within the first external wall for secure mounting in relation thereto; an alignment jig comprising a mounting plate engagement structure and an alignment barrel extending therefrom to define a LoS axis between the first external wall and the opposed external wall; wherein said alignment barrel is dimensioned to receive an aperture-forming tool operable therethrough along said LoS axis so to form a counterpart external wall LoS aperture within the opposed external wall such that the counterpart LoS sensor components can be operatively mounted in alignment with the first external wall LoS aperture and the counterpart external wall LoS aperture for operation along said LoS axis.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

Figure 1:
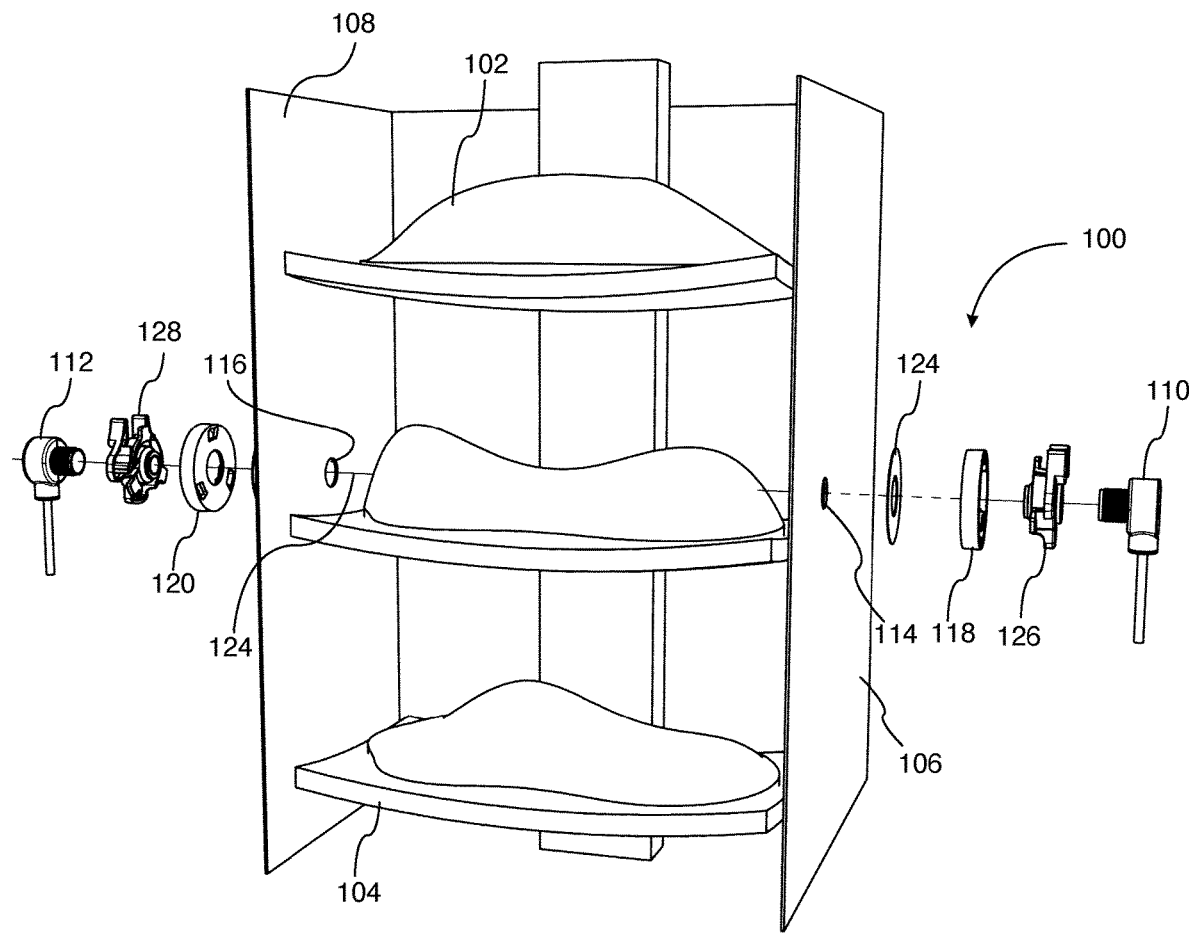
FIG. 1 is an exploded perspective view of a line-of-sight LoS sensor mounting system, in this example mounted for LoS sensing on a grain elevator, in accordance with one embodiment.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Unless defined otherwise, all technical and scientific terms used herein have the same meaning as commonly understood by one of ordinary skill in the art to which this invention belongs.

Throughout the specification and claims, the following terms take the meanings explicitly associated herein, unless the context clearly dictates otherwise. The phrase "in one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or element(s) as appropriate.

The systems and methods described herein provide, in accordance with different embodiments, different examples of a line-of-sight (LoS) sensor mounting system and method, wherein components of the mounting system enable for an aligned mounting of the LoS sensor components across a monitored volume, such as a LoS transmitter and receiver pair, even in circumstances where one of the pair is to be mounted on an otherwise obstructed or difficult-to-access structure.

For illustrative purposes, the following examples will be provided within the context of a LoS sensor system to be mounted on an agricultural device in monitoring a harvest yield, for example, on a (clean) grain elevator of a combine harvester (e.g. to harvest grain, bean, corn, rice, etc.). Naturally, other agricultural examples may equally apply whereby grain or other harvested materials are conveyed, fed, channeled or otherwise transported or transferred along a material transfer channel from one region to another, and whereby a LoS sensor system can be deployed such that the material transfer can be monitored and quantified in real time, for example, by translating a variable obstruction of the LoS sensor system over time by the transferred material into a quantifiable measure of such transferred material. Accordingly, the person of ordinary skill in the art will readily appreciate that, while an agricultural setting is proposed in the herein-described embodiments, other industrial and/or commercial settings may equally apply.

In particular, as will be described in greater detail below, the systems and methods described herein may facilitate installation and/or alignment of the LoS sensor system components where direct installation and/or alignment is adversely obstructed by surrounding equipment, machinery, or like structures, or again, frustrated by inconvenient installation or mounting geometries. Indeed, illustrative mounting components as described herein are provided, in accordance with different embodiments, to promote operative alignment between a LoS transmitter and receiver across a given body that is at least partially defined by substantially opposed walls or structures, generically referred to herein as opposed external walls for illustrative purposes, whereby only one of these walls is readily accessible to aperture-forming tools, such as a drill or like equipment, or other mounting tools and equipment.

While examples provided herein mainly contemplate the aligned counterpart installation of a LoS transmitter and receiver pair, other sensing system configurations and components may also be considered. For example, a double pass LoS sensor system may instead include the aligned disposition of a transmitter/receiver on one side, and a reflector on the other. Likewise, while obstructed LoS signal monitoring may be implemented within an optical LoS system, other LoS sensing technologies may also or otherwise be considered within a similar context. For instance, LoS monitoring may be implemented as a function of signal attenuation within the context of a radio frequency (RF) LoS signal, as can other configurations be considered without departing from the general scope and nature of the present disclosure.

With reference to FIG. 1, and in accordance with one exemplary embodiment, a LoS sensor mounting system, generally referred to using the numeral 100, will now be described. In the illustrated embodiment, the system 100 is to be mounted and aligned to monitor an agricultural yield in real time as grain 102 or other agricultural material is conveyed or otherwise transferred in by an agricultural machine. For example, grain 102 is illustratively conveyed by transfer paddles 104 within a material transfer channel such as that illustratively depicted by first and opposed external walls 106 and 108, respectively.

In this particular embodiment, the system 100 comprises a LoS transmitter 110 and a LoS receiver 112 to be operatively mounted in LoS alignment across the transfer channel, namely in relation to first and counterpart LoS apertures (114 and 116 respectively) defined or otherwise formed within the first and opposed external walls 106 and 108, such that a transmitter signal transmitted through the first LoS aperture 114 is detectable by the receiver 112 via the counterpart aperture 116. As depicted in the example of FIG. 1, the time variable obstruction of this signal by the transferred grain 102 can be translated into a quantified amount of gain being transferred over time, which is itself can be used to quantify a harvesting yield as the agricultural machine harvests a particular field or area.

Naturally, in order for the sensor system to operate effectively, proper alignment of the transmitter 110 and receiver 112 must be established. In unobstructed installations, one could more readily form the opposed LoS apertures in the machinery at hand using precise measurements. However, in many installations, access to one or the other wall 106, 108 may be inconveniently obstructed such that proper operation of standard drilling or piercing and alignment tools may be challenged. For example, while one may have ready physical/visual access to an outward facing wall of the equipment to be monitored, a rear or back facing wall may not be readily accessible or visible.

Figure 2:
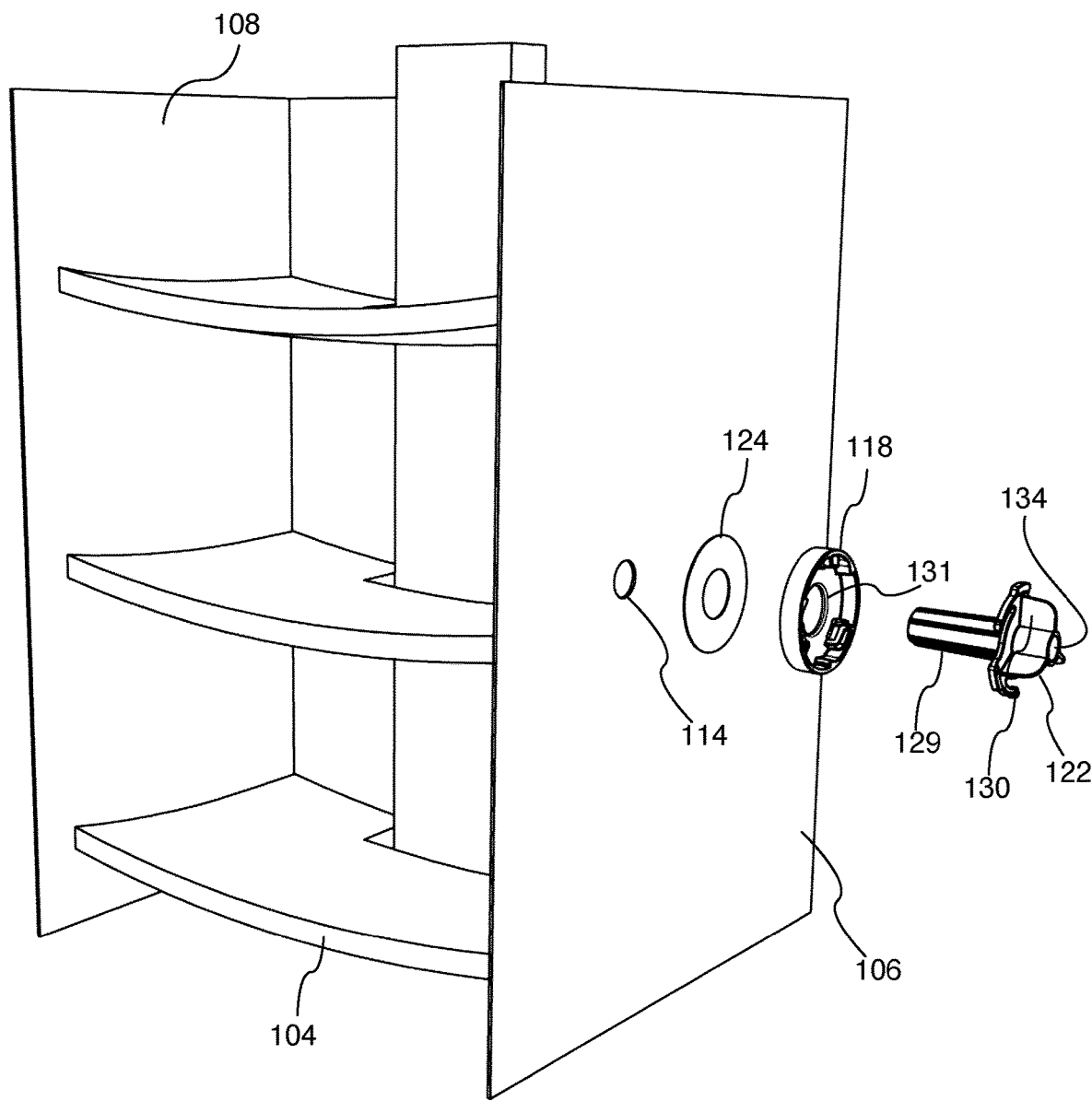
FIG. 2 is an exploded perspective view of a transmitter mounting plate and alignment jig of the LoS sensor mounting system of FIG. 1, in which the alignment jig is used to align mounting of the transmitter mounting plate with an aperture formed in an accessible grain elevator wall, in accordance with one embodiment.

Therefore, in accordance with one embodiment, and with added reference to FIG. 2, the system 100 further comprises respective transmitter and receiver mounting plates (discs) 118, 120, and an alignment jig 122, that can be used cooperatively to both form apertures 114 and 116 in proper alignment to define a LoS axis 124, and mount the transmitter 110 and receiver 112 so to operate in alignment along that axis. In this particular embodiment, the transmitter and receiver mounting plates 118, 120 are secured to the external walls 106, 108 via respective adhesive layers 124 (e.g. peal-back, applied or otherwise provide adhesive means), though other securing means such as fasteners (e.g. rivets, screws, pins), welding, or the like may be considered depending on the application at hand, the geometry of the installation and/or the space available internally and/or externally for accommodating different securing means. For example, in some embodiments, a 3M™ VHB™ adhesives (e.g. VHB 5925) are used to form an extremely solid bond between the mounting plate(s) and the equipment to which they are adhered, thus providing a suitable bond for most agricultural, industrial or commercial applications. Furthermore, using an adhesive layer provides an advantage over fasteners, which could otherwise penetrate the monitored volume, for example, and obstruct normal operation of the machinery (e.g. interfere with motion of grain elevator paddles). Once the mounting plates are secured, the transmitter 110 and receiver 112 are thereafter securely mounted thereto via respective transmitter and receiver mounts 126, 128 that are secured in proper alignment via a cooperative twist-lock mechanism, to be described in greater detail below. Indeed, mounts 126 and 128 allow for the right-angle transmitter and receiver components to be effortlessly mounted in proper operative alignment while minimizing potential challenges or issues in managing sensor wiring or the like. As will be appreciated by the skilled artisan, these components may be manufactured of various materials using various methods, such as injection molding, or the like.

With particular reference to FIG. 2, in order to mount the LoS sensor system at its intended location, the first LoS aperture 114 is formed within the first wall 106, in this example first using a standard pilot hole drill bit followed by a stepper drill bit of a predefined dimension selected according to a dimension of the transmitter and its mounting hardware. The defined aperture may also be deburred or otherwise cleaned or smoothed to improve mounting efficiency. Once the aperture 114 has been formed, the alignment jig 122 is engaged with the mounting plate 118 such that an alignment barrel 129 thereof is inserted through a corresponding LoS aperture 131 defined within the mounting plate 118. In this embodiment, the alignment jig 122 comprises a mounting plate engagement portion 130 that securely engages the mounting plate 118 via a cooperative twist-lock mechanism (described below), such that the alignment barrel 129 protrudes substantially perpendicularly to the external wall 106 and mounting plate 118 secured thereon, thus aligning the barrel 129 with a LoS axis to be later operatively defined the LoS transmitter.

As will be detailed further below, other mounting plate engagement means may also be considered, such as pressure or structurally snug fit engagements, or the like, without departing from the general scope and nature of the present disclosure. Further, while the illustrated embodiment describes an alignment barrel 129 that extends mostly toward an interior of the equipment through the LoS aperture, the alignment barrel could also or otherwise extend outwardly to provide a similar effect in that, as the barrel is rigidly coupled at a right angle from the aperture via engagement with the mounting plate, the LoS axis can be effectively defined and maintained during drilling or like aperture-forming or locating actions. Indeed, the currently illustrated embodiment encompasses an alignment barrel that doubles in aligning the alignment jig with the corresponding LoS aperture and in further guiding operation of an aperture-forming tool extension therethrough in line with a defined LoS axis. However, the guiding/aligning structure could alternatively extend equally or differently on either side of the mounting plate engagement portion, and that, without departing from the general scope and nature of the present disclosure.

In this example, the adhesive layer 124 is applied or revealed, ready to secure the mounting plate 118 in relation to the formed LoS aperture 114. To improve adhesion, the surface may be cleaned or otherwise prepared (e.g. alcohol swab wipe). So to ensure proper location of the mounting plate relative to the LoS aperture 114, the alignment barrel 129, protruding from the mounting plate 118, is inserted through the LoS aperture 114, as the mounting plate is secured to the wall 106 via the adhesive strip 124.

Figure 3:
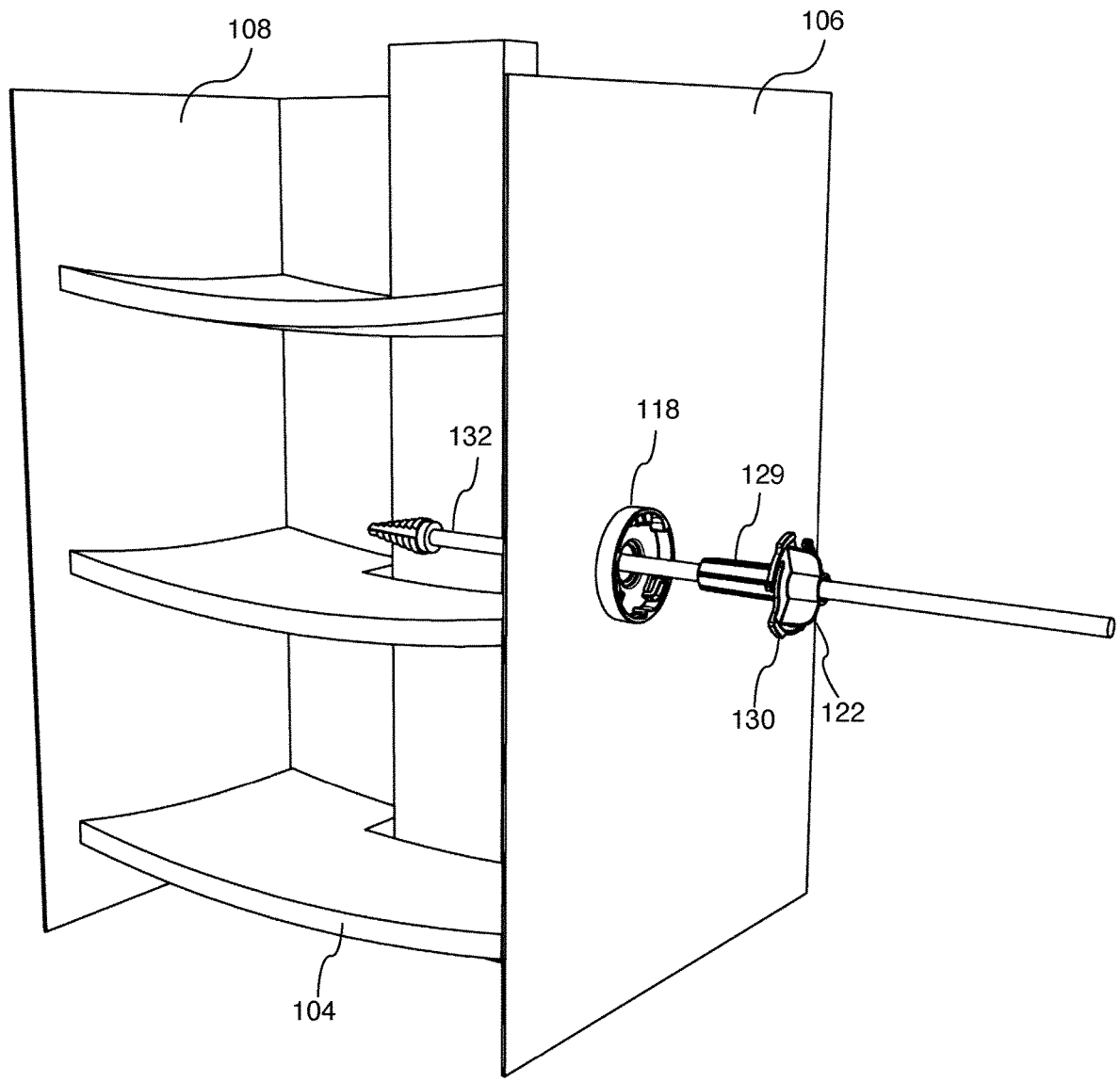
FIG. 3 is perspective view of the alignment jig of FIG. 2 being used to align a drill extension through the aperture formed in the accessible grain elevator wall via secure engagement with the previously mounted transmitter mounting plate, so to actively drill a corresponding LoS aperture on an opposed, and in this example, less accessible, counterpart grain elevator wall, in accordance with one embodiment.
Figure 4:
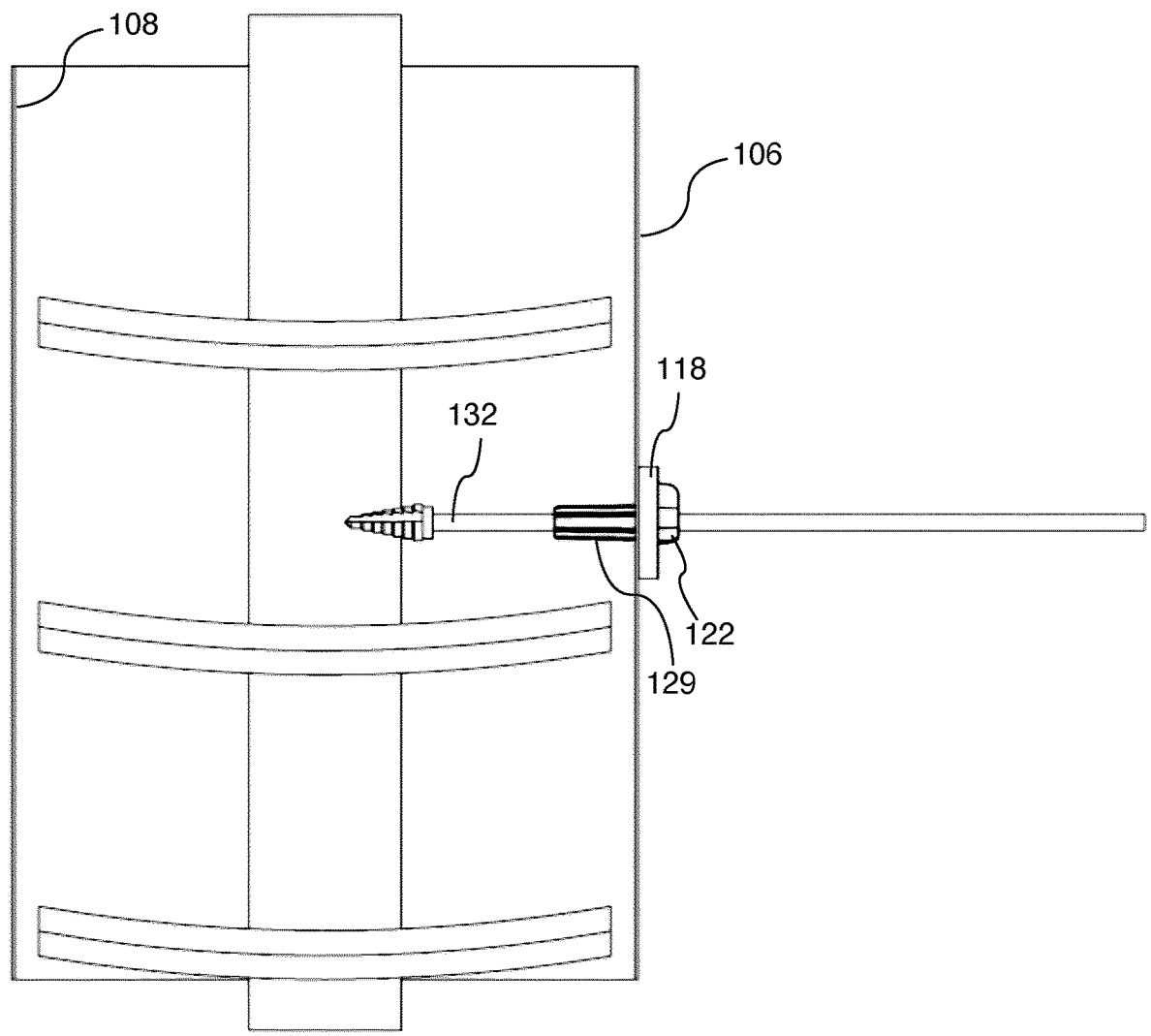
FIGS. 4 and 5 are side and perspective views, respectively, of the alignment jig of FIG. 3, once securely engaged with the transmitter mounting plate, to guide operative alignment of the drill extension while drilling the counterpart LoS aperture on the opposed grain elevator wall, in accordance with one embodiment.
Figure 5:
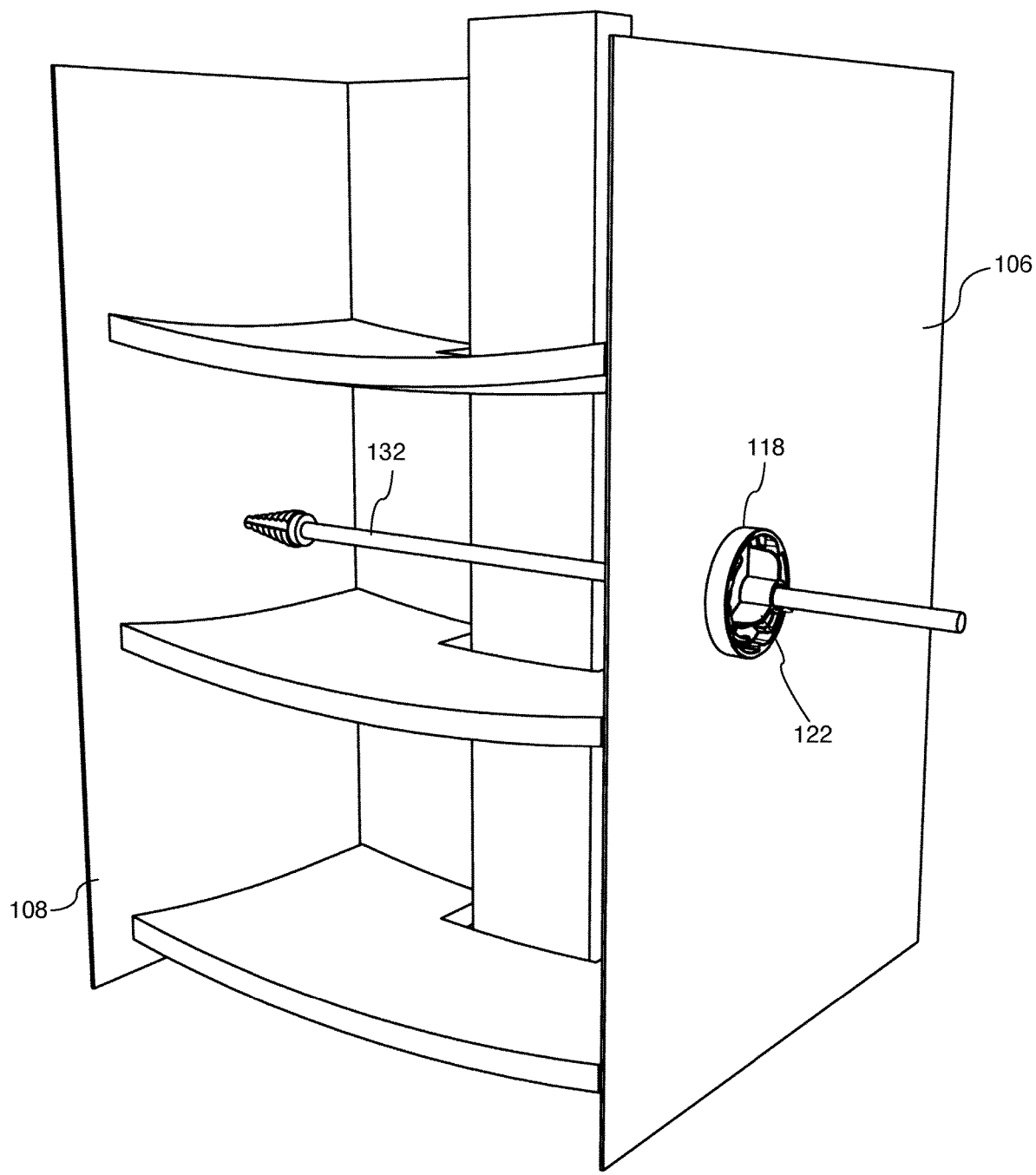

With added reference to FIGS. 3, 4 and 5, once the transmitter mounting plate 118 is secured to the first external wall 106 in proper alignment with the first LoS aperture 114, the alignment jig 122 can be used to facilitate forming of the counterpart LoS aperture 116 in the opposed wall 108. For example, an inner channel 134 of the alignment barrel 129 can be appropriately dimensioned to receive a drill extension 132 (or like aperture-forming tool) therethrough so to guide formation of the counterpart aperture 116 while the alignment jig 122 is engaged with the mounting plate 118 (e.g. see FIGS. 4 and 5). For example, while the alignment jig 122 is shown as disengaged from the mounting plate 118 in FIG. 3 for better illustrative purposes, the engagement portion 130 of the alignment jig 122 may remain fastened to the mounting plate 118 during formation of the counterpart aperture 116. In some embodiments the alignment jig 122 may instead remain engaged with the mounting plate 118 only during formation of a pilot hole, or again at first when forming the stepper drill portion, until the aligned drilling location is stabilized. Disengagement partway through the drilling process may then reduce wear or damage of the components without unduly impacting alignment. The defined aperture may also be deburred or otherwise cleaned or smoothed after drilling to improve subsequent mounting efficiency. Ultimately, by using the alignment jig barrel 129 to align the drill extension 132 in forming the counterpart aperture, the first and counterpart apertures will consequently define the LoS axis along which the transmitter and emitter will be operated.

Figure 6:
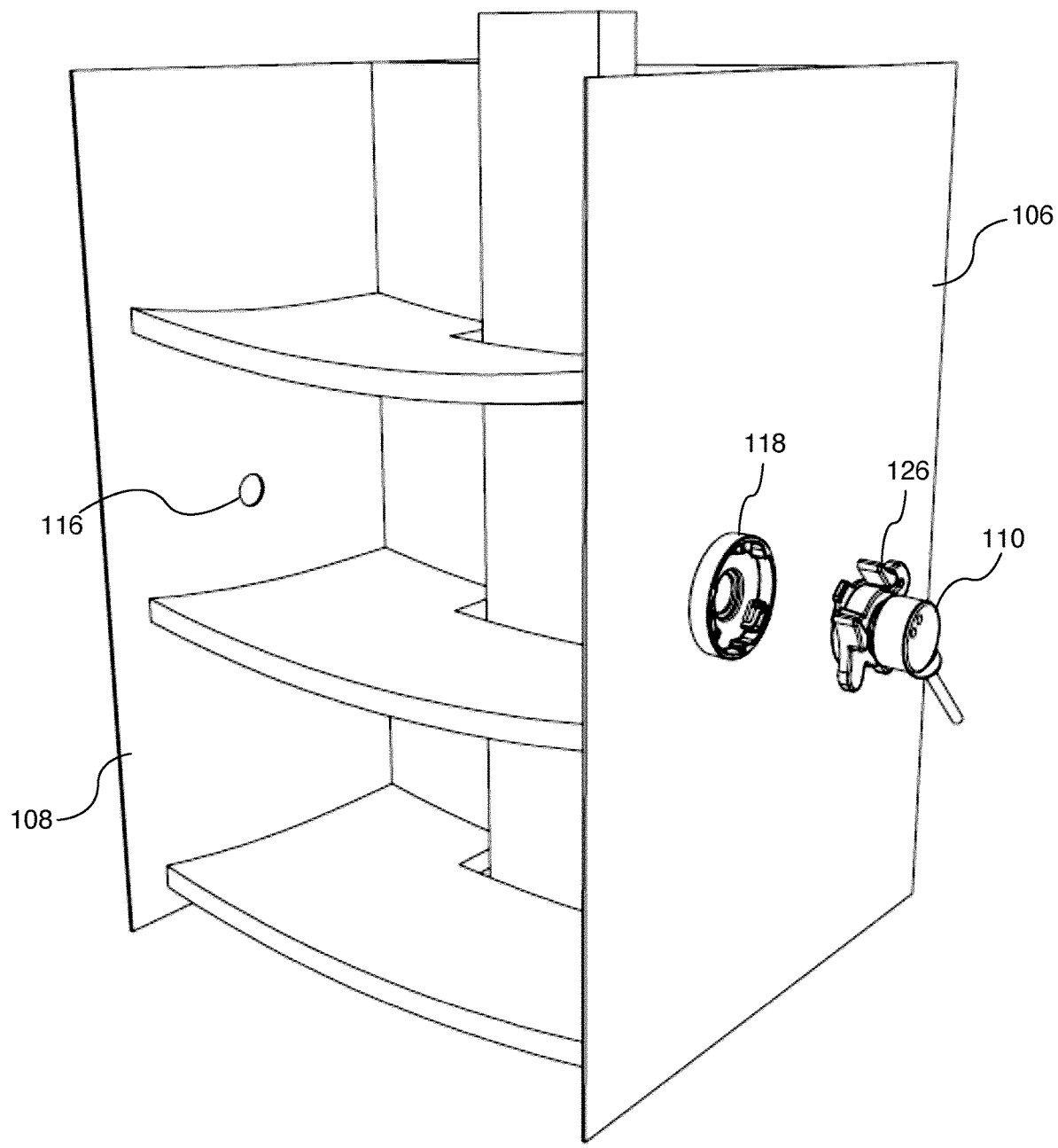
FIG. 6 is a perspective view of a transmitter nested within a transmitter mount and aligned to be securely mounted within the transmitter mounting plate previously mounted as shown in FIG. 2, in accordance with one embodiment.
Figure 7:
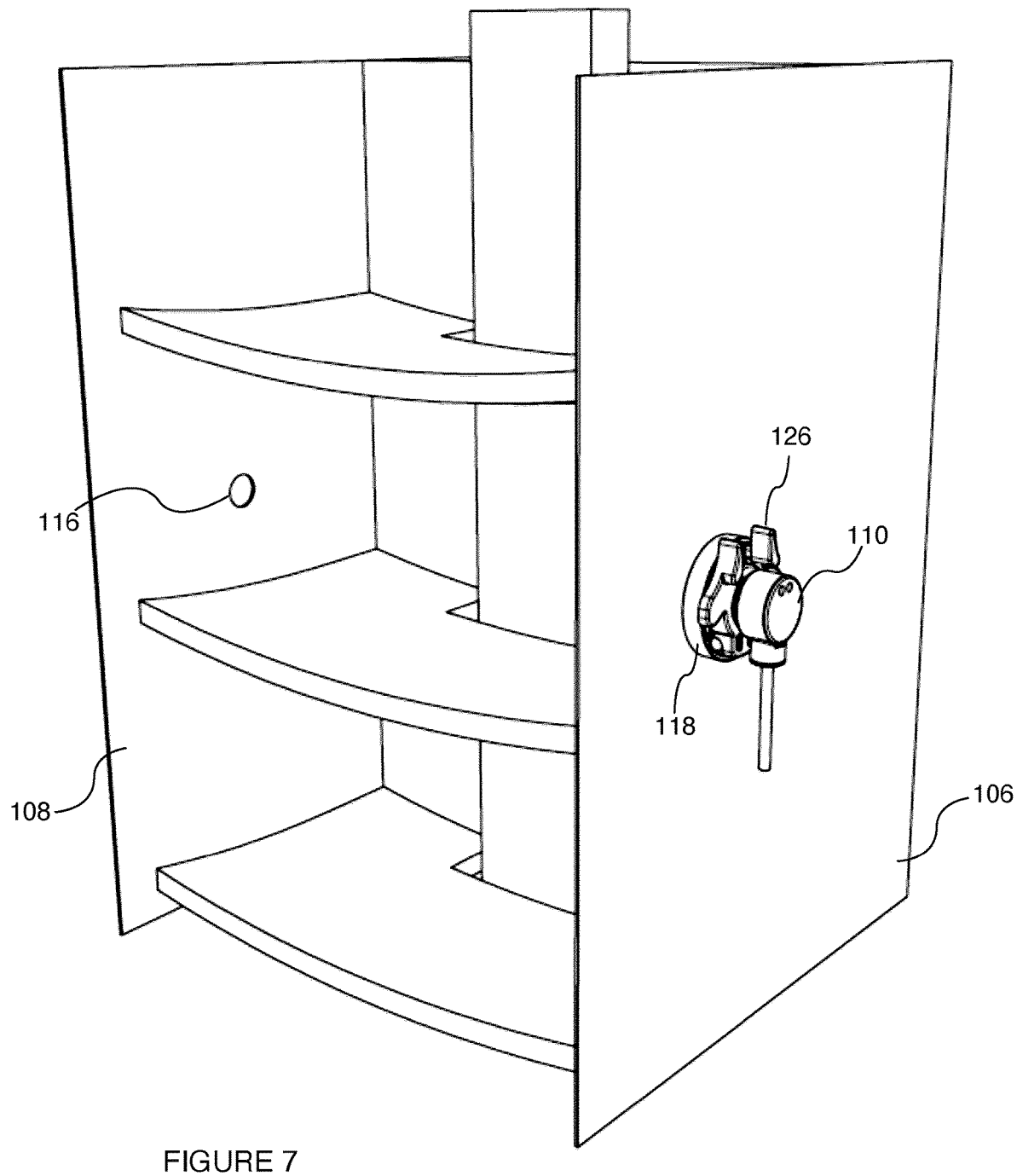
FIG. 7 is a perspective view of the transmitter and transmitter mount of FIG. 6 once securely mounted within the transmitter mounting plate via a cooperative twist-lock securing mechanism, in accordance with one embodiment.

With reference to FIG. 6, once the counterpart aperture is formed 116, the alignment jig 122 and aperture-forming tool can be withdrawn, leaving the transmitter mounting plate 118 ready to receive the transmitter mount 126 and transmitter 110 for operative mounting thereto. As will be further detailed below, the transmitter mount 126 is aligned to axially engage the mounting plate 118 at an angle (FIG. 6), and then securely twist-locked into place by engaging the cooperative locking mechanism thereof (FIG. 7). In secure position, the transmitter 110 in operation will automatically transmit a LoS signal along the LoS axis defined to the counterpart aperture 116 and previously defined by the alignment jig barrel 129.

As noted above, the tools and approach described above allows for the formation of the counterpart aperture 116 in proper alignment without having direct or unobstructed access to the opposed external wall 108. One could then reach over and secure the LoS receiver in relation to the counterpart aperture 116 and ensure proper alignment, and that, even if the opposed wall 108 is not parallel to the first wall 106. Indeed, most LoS receivers will have a defined viewing angle that permits for non-parallel installation. Indeed, by operating the aperture-forming tool along the LoS axis, positioning of the counterpart aperture 116, even if formed in a non-parallel wall, will allow for the successful operative installation of a receiver that can capture the LoS transmission from the LoS transmitter along the LoS axis provided this receiver has a sufficiently broad viewing angle, the required viewing angle in part dictated by the relative angle formed between the first and opposed walls. That being said, many installations will be defined by substantially parallel walls or enclosures, thereby limiting requirements for receiver view angles.

Figure 8:
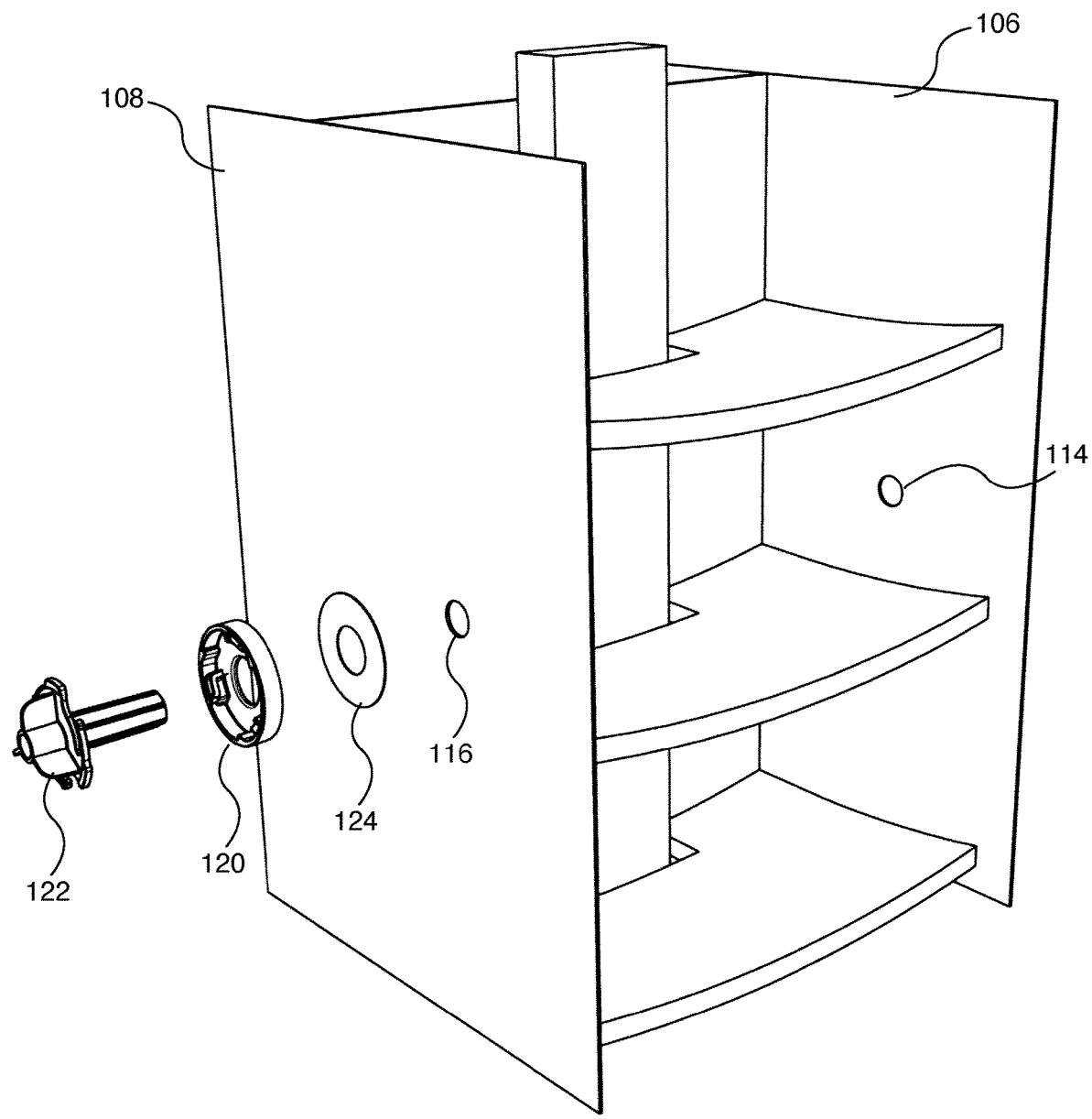
FIG. 8 is an exploded perspective view of a receiver mounting plate and the alignment jig of FIG. 2, in which the alignment jig is used to align mounting of the receiver mounting plate with the counterpart aperture formed by the drill extension as shown in FIGS. 4 and 5, in accordance with one embodiment.

In order to further promote proper alignment, in some embodiments, as introduced above, a receiver mounting plate 120 may also be provided and aligned using the same alignment jig 122. For example, as shows in FIG. 8, the alignment jig 122 can be engaged with the receiver mounting plate 120 to align securing of the receiver mounting plate 120 in relation to the now-formed counterpart LoS aperture 116. For ease of manufacturing, the receiver mounting plate 120 can be more or less identical to the transmitter mounting plate 118 so to equally engage with the same alignment jig 122. Once aligned, the adhesive or other securing means provided for the mounting plate 120 can be secured, and the alignment jig 122 withdrawn, leaving the receiver mounting plate 120 ready to receive the receiver mount 128 and receiver 112 for operative mounting thereto.

Figure 9:
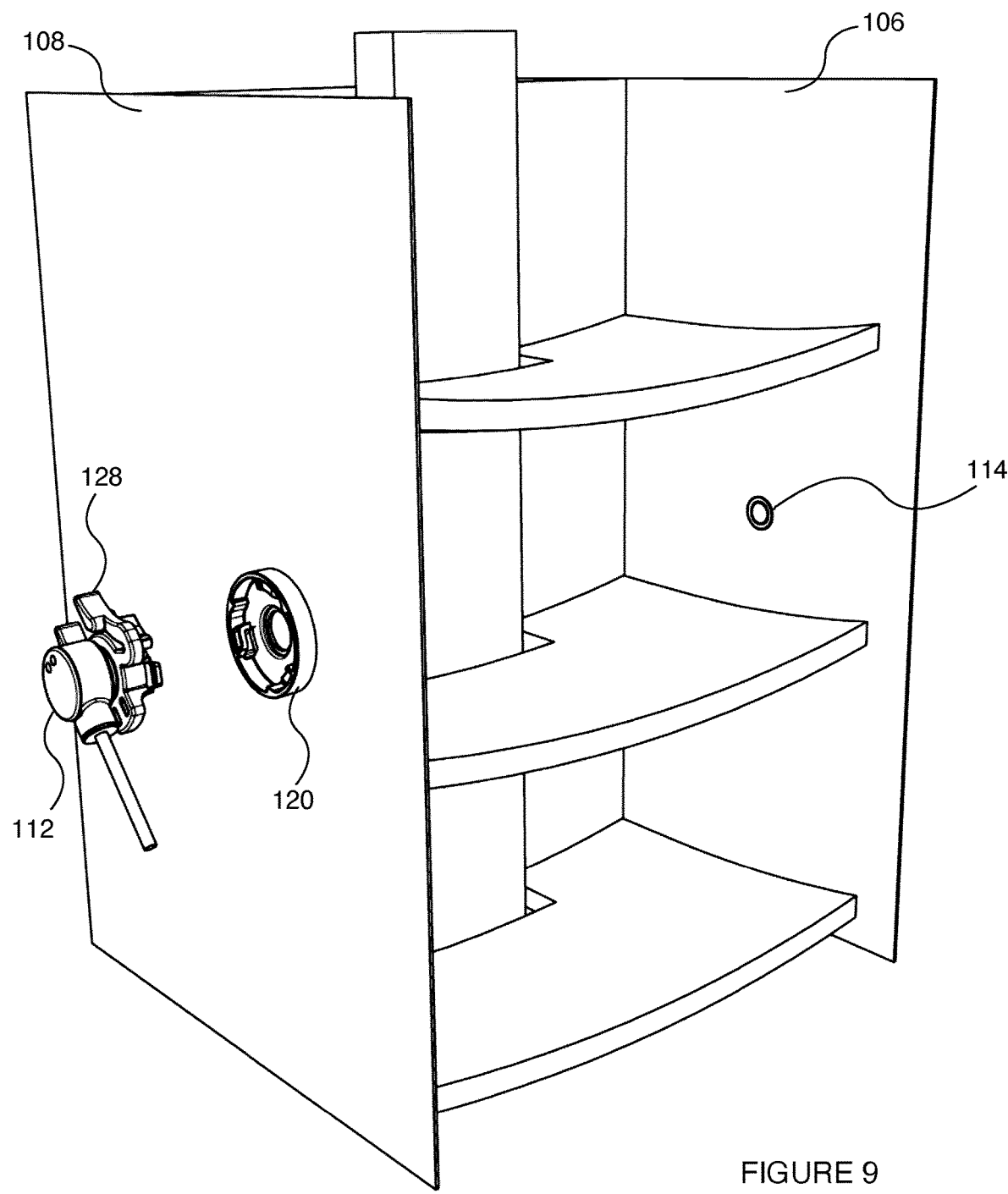
FIG. 9 is a perspective view of a receiver nested within a receiver mount and aligned to be securely mounted within the receiver mounting plate previously mounted as shown in FIG. 8, in accordance with one embodiment.
Figure 10:
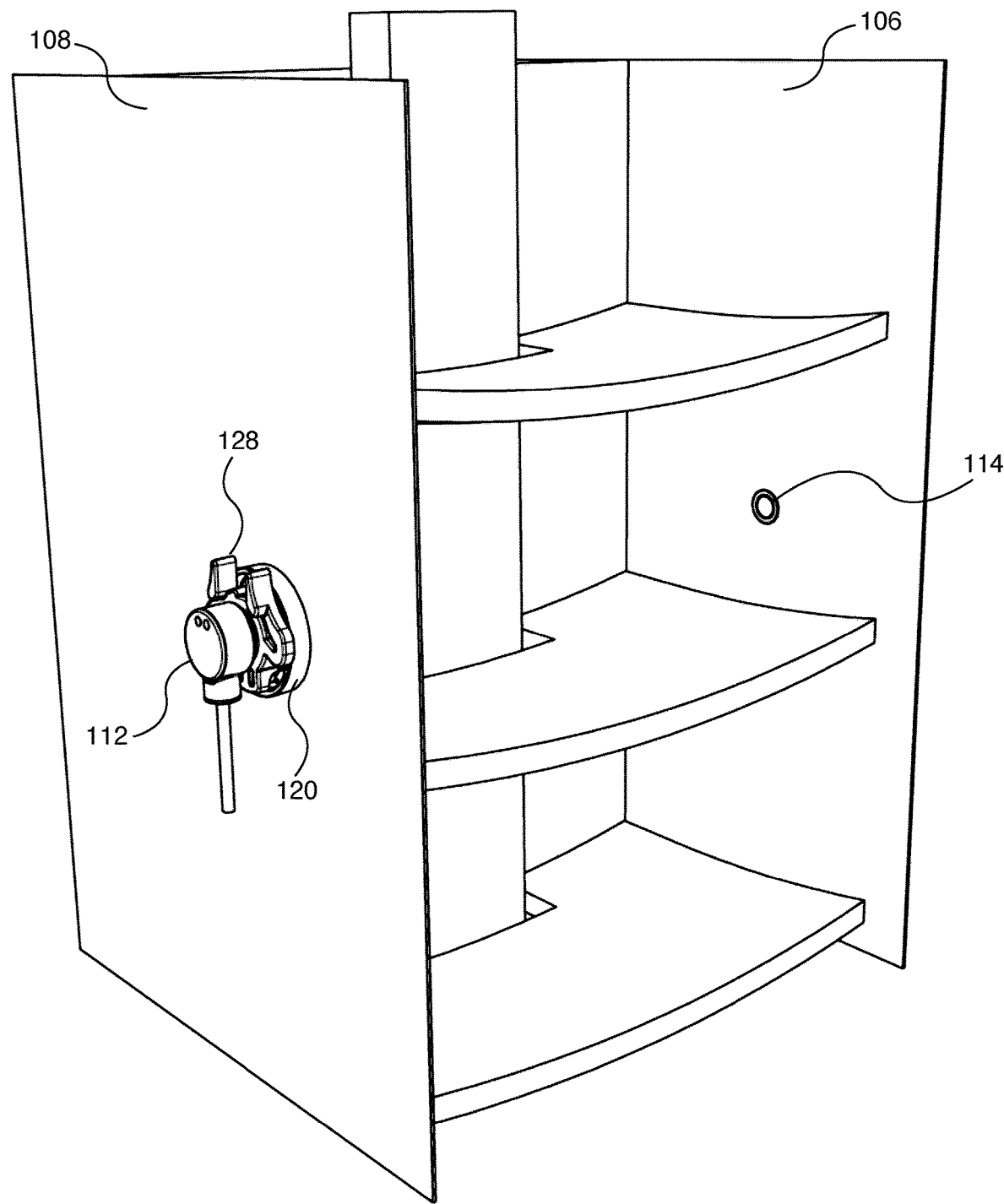
FIG. 10 is a perspective view of the receiver and receiver mount of FIG. 9 once securely mounted within the receiver mounting plate via a cooperative twist-lock securing mechanism, in accordance with one embodiment.
Figure 15A:
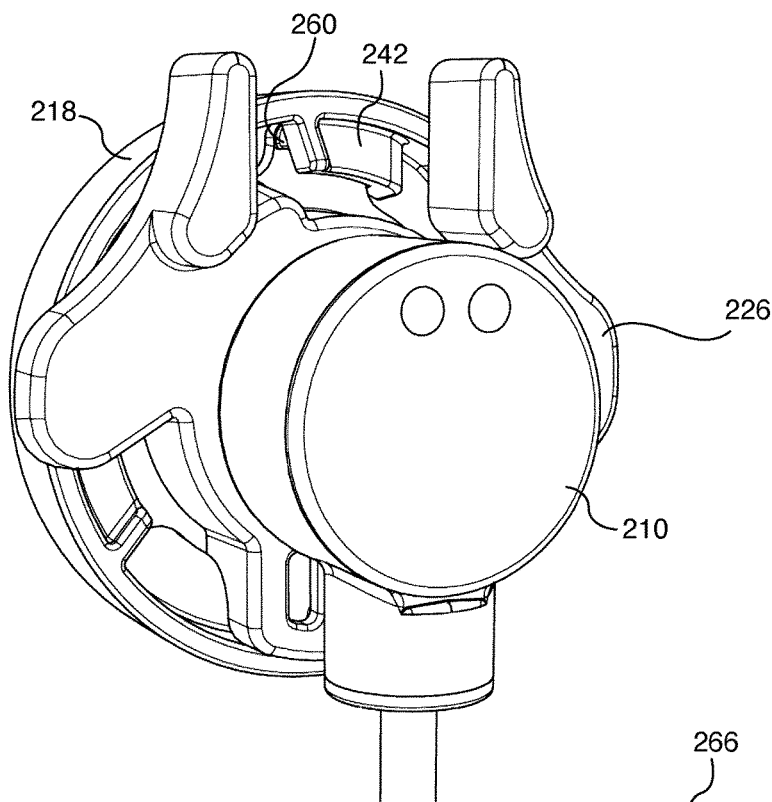
FIG. 15A is a perspective view of the assembled transmitter/receiver of FIGS. 14A and 14B once secured within their corresponding mounting plate, in accordance with one embodiment.
Figure 15B:
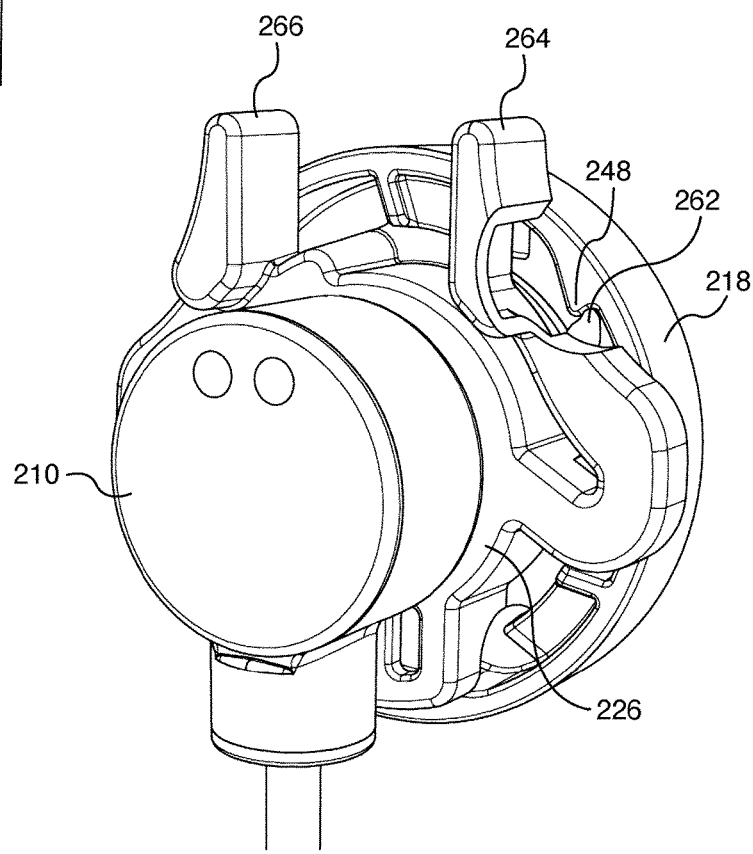
FIG. 15B is another perspective view of the assembled transmitter/receiver of FIGS. 14A and 14B once secured within their corresponding mounting plate, with a cutaway portion showing an internal detail of a locking mechanism thereof, in accordance with one embodiment.

As similarly noted above with reference to FIGS. 6 and 7, and with reference to FIGS. 9 and 10, the receiver mount 128 is aligned to axially engage the mounting plate 120 at an angle (FIG. 9), and then securely twist-locked into place by engaging the cooperative locking mechanism thereof (FIG. 10). In secure position, the receiver 112 will automatically be aligned to receive a LoS signal along the LoS axis from the transmitter 110. As will be detailed further below with particular reference to FIGS. 15A and 15B, a bayonet-style rotation engagement and snap-lock mechanism may be employed to secure the receiver to the mounting plate. However, other engagement and/or locking mechanisms may be considered to provide a similar effect. For example, a bayonet-style rotation engagement may be employed to align the components in a desired alignment, and secured into place thereafter with a threaded faster or the like. In one such embodiment, the receiver/transmitter mount may be rotationally engaged with the mounting plate, and include a fastening hole that aligns, once in rotational position, with a corresponding hole/boss in the mounting plate so to receive a threaded fastener in fastening engagement therethrough.

In yet another example, the receiver/transmitter mount may be configured for full threaded engagement with its corresponding mounting plate. For example, a threaded sensor mount could be fastened in secure engagement with its corresponding mounting plate without any further securing means. So to avoid a sensor cable becoming wound about the sensor mount or mounting plate, a short sensor cable connector may be included such that any extended sensor cabling or harness is only operatively connected thereto once the sensor has been fastened into place. Naturally, use of a wireless sensor may negate the need for any such accommodation.

Other securing mechanisms may also be considered, as can other non-rotational engagement mechanisms, without departing from the general scope and nature of the present disclosure. These may include, but are not limited to, reversible or irreversible engagement mechanisms, fasteners, adhesives or the like whereby an operative alignment of the sensor once mounted is guided by its secure engagement with the mounting plate. Similar considerations may also apply to secure engagement between the alignment jig and mounting plate, for example, in guiding aligned formation of the counterpart LoS aperture.

Figure 11:
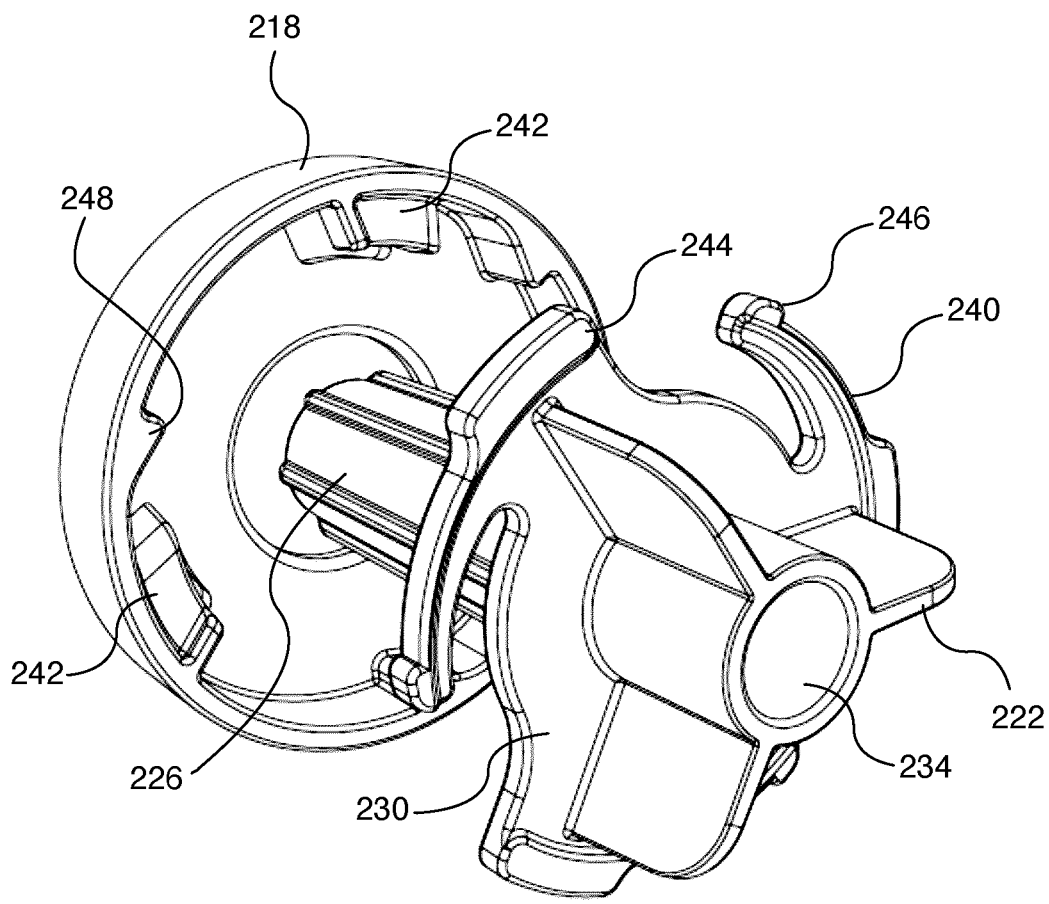
FIG. 11 is a detailed perspective view of an alignment of the alignment jig and the transmitter mounting plate of FIG. 2, in accordance with one embodiment.
Figure 12A:
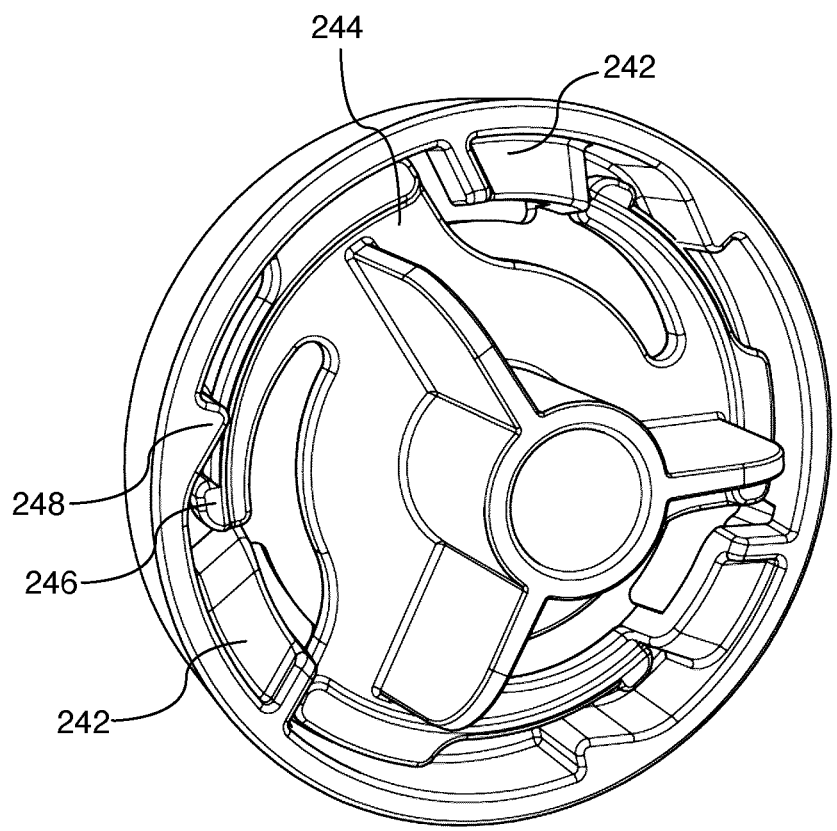
FIGS. 12A and 12B are detailed perspective views of the alignment jig and the transmitter mounting plate of FIG. 11, once the former is inserted therein, and twisted to be secured therein, respectively, in accordance with one embodiment.
Figure 12B:
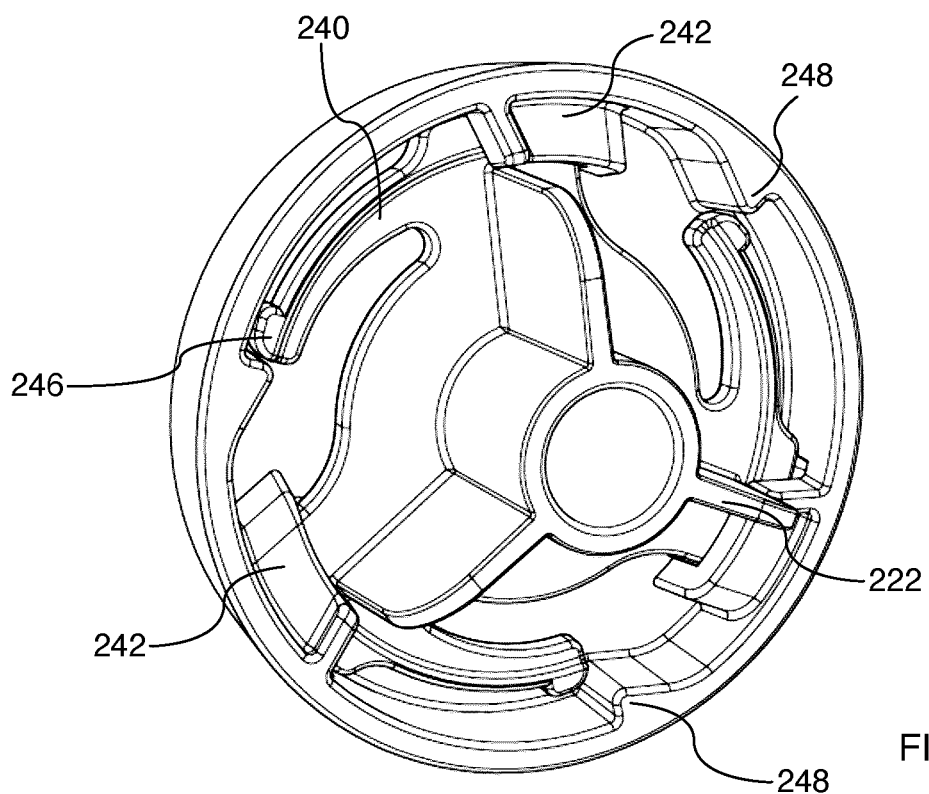

With reference to FIGS. 11, 12A and 12, and in accordance with one detailed embodiment, an illustrative cooperative assembly of a mounting plate 218 and alignment jig 222, as introduced above, will now be described. In this particular embodiment, as noted above, the alignment jig 222 comprises an alignment barrel 226, defining an inner channel 234, structurally coupled (e.g. integrally formed) with a mounting plate engagement structure 230. In particular, the engagement structure 230 comprises a set of circumscribing engagement arms 240 that extend arcuately from the structure's core to cooperatively engage corresponding circumferentially arcuate engagement channels 242 formed within the mounting plate 218. As shown in FIG. 12A, the arms 240 of the jig 222 first axially nest within corresponding circumferential spaces defined between each engagement channel 242 before being rotated (FIG. 12B) such that a shoulder portion 244 of each arm 240 rotationally engages a corresponding engagement channel 242 until a distal end 246 of each arm 240 snaps into a reversibly locked relationship with a corresponding radially extending snap-locking protrusion 248. In order to unlock and withdraw the alignment jig 222, a reverse rotation may be applied to the jig 222 to urge the distal ends 246 back beyond the snap-locking protrusions 248, namely by acting against a natural structural spring bias of the arms 240.

Figure 13A:
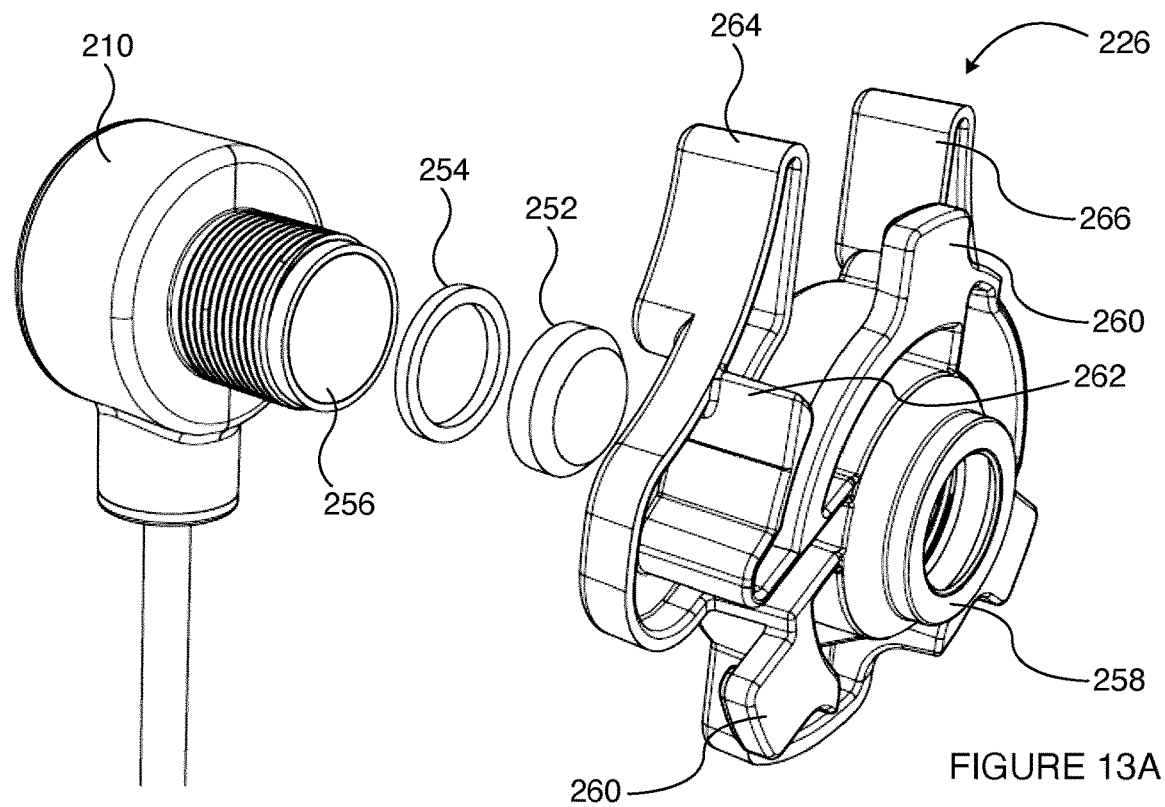
FIGS. 13A and 13B are perspective front and rear exploded views of an assembly of the transmitter/receiver of the LoS sensor mounting system of FIG. 1 with its corresponding transmitter/receiver mount, in accordance with one embodiment.
Figure 13B:
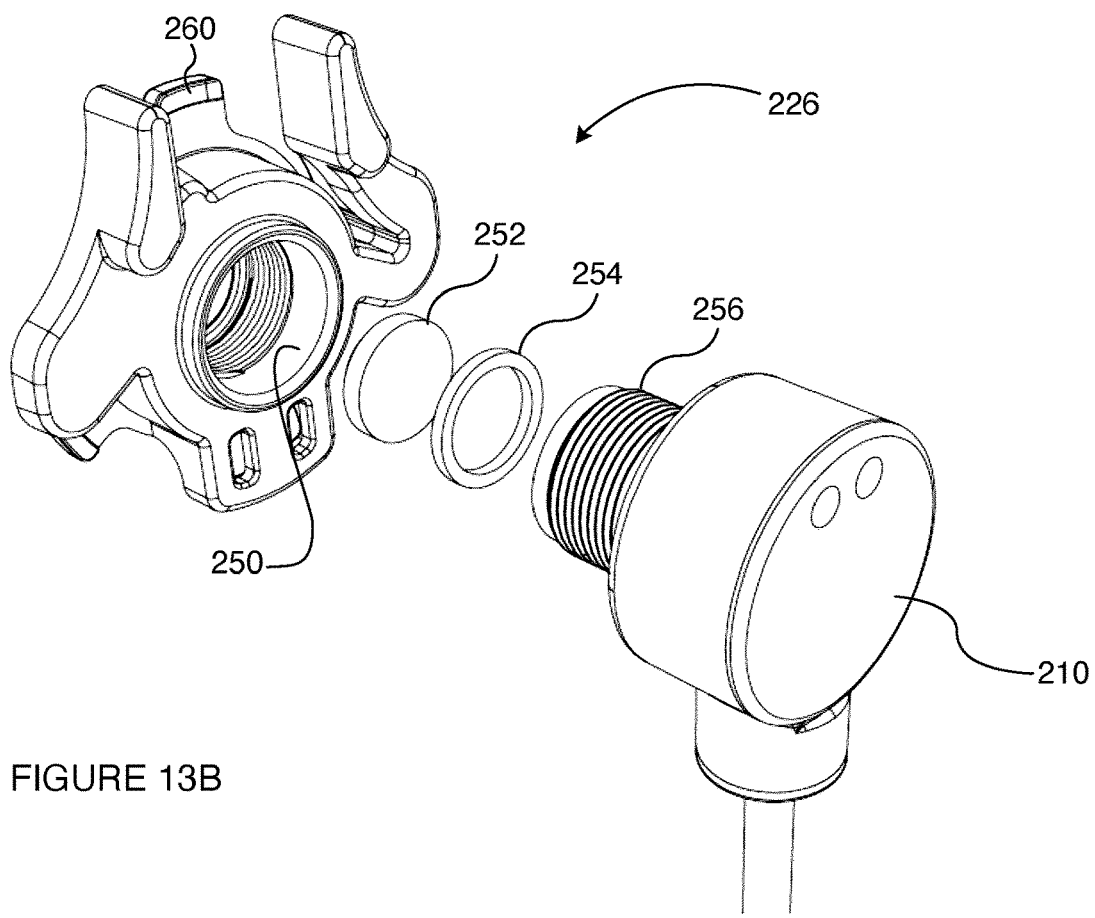
Figure 14A:
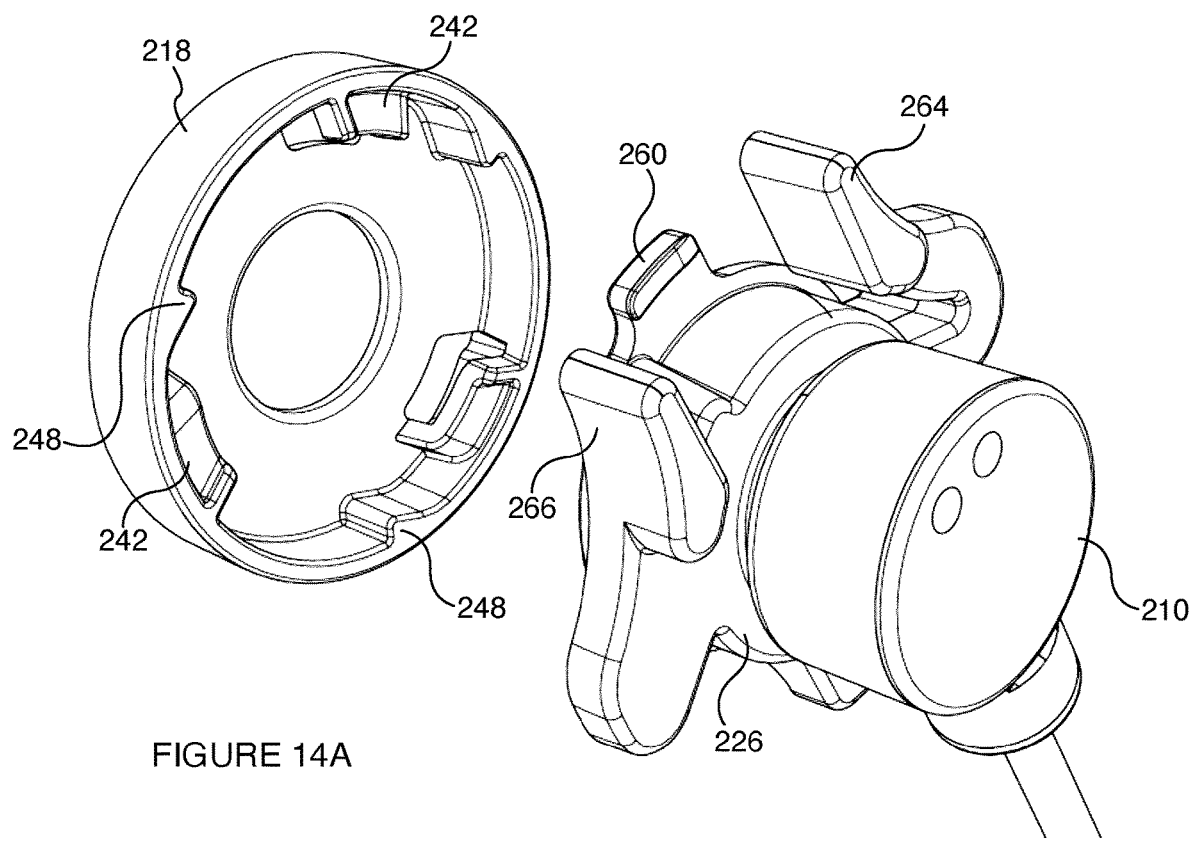
FIGS. 14A and 14B are perspective top and side views of the transmitter/receiver and corresponding transmitter/receiver mount of FIGS. 13A and 13B, once assembled, in alignment with their corresponding mounting plate, in accordance with one embodiment.
Figure 14B:
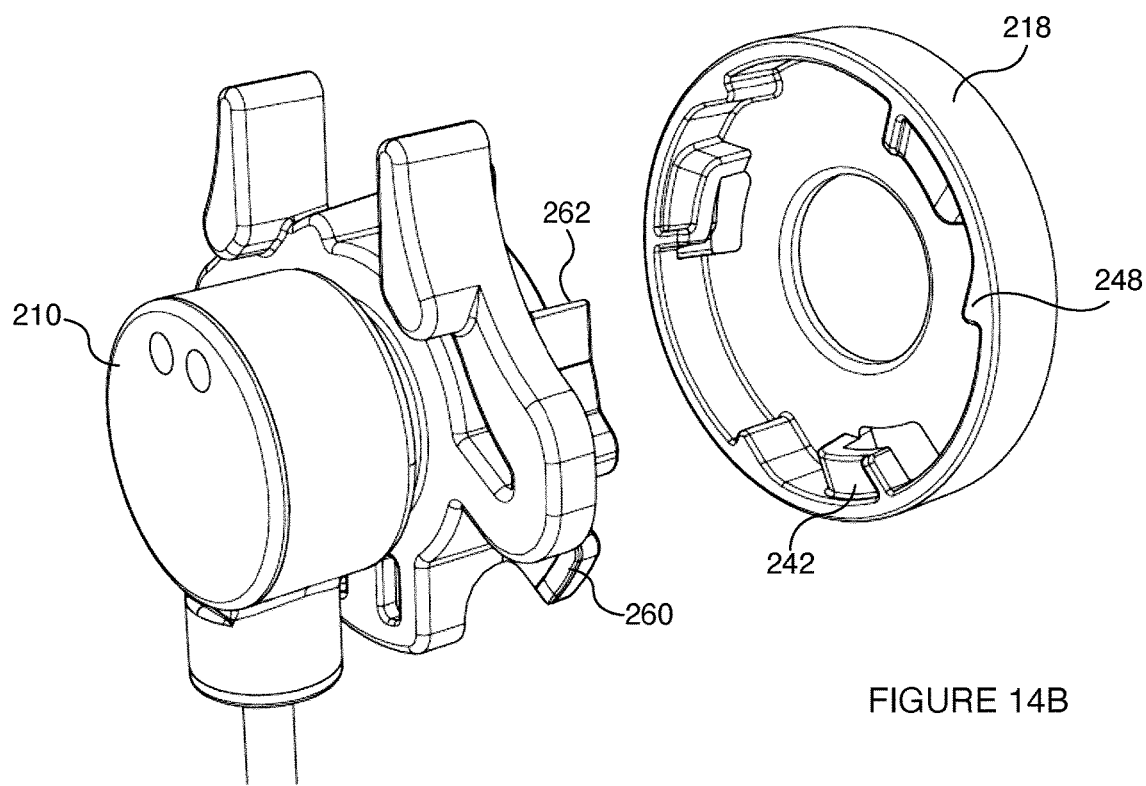

With reference to FIGS. 13A and 13B, and in accordance with one detailed embodiment, an illustrative assembly of a LoS transmitter/receiver 210 (referred to below as transmitter for ease of description) and corresponding mount 226, will now be described. In this embodiment, the mount 226 is dimensioned to receive within an optical channel 250 formed centrally therein, in sequence, an optical lens 252 (e.g. borosilicate lens), an O-ring seal or spacer 254, and a transmitter output structure 256. Accordingly, the replaceable lens 252 can increase sensor longevity as the sensor component itself is not directly exposed to the transferred medium. As will be appreciated by the skilled artisan, different assembling means may be considered to assemble or otherwise mount the transmitter 210 and mount 226, such as through threaded engagement (as shown), pressure fit, adhesive, or the like. For example, in the illustrated embodiment, any optical sensor of the same dimension (i.e. bearing the same threaded optical barrel dimensions) can be used interchangeably without significant effort. Furthermore, given the application at hand, appropriate optics may be added or changed to accommodate different optical geometries or performance characteristics, such as to collimate, focus or spread a corresponding LoS transmission signal and/or optically optimize reception thereof at a corresponding receiver. In this particular embodiment, the mount 226 is further manufactured to provide a hollow engagement hub 258 dimensioned to correspond, and thus fit within, a corresponding LoS aperture formed in the machinery to which it is to be operatively mounted. Namely, in the example illustrated in FIG. 1, the first and counterpart LoS apertures 114, 116 may be dimensioned to correspond, within tolerance, to a dimension of each mount engagement hub 258.

With added reference to FIGS. 14A, 14B, 15A and 15B, each mount 226 is configured to engage similar mounting plate engagement structures as described above with reference to FIGS. 11, 12A and 12B. For instance, the exemplary mount 226 comprises a set of radially extending engagement tabs 260 shaped and configured to axially engage the circumferential spaces defined between each engagement channel 242 before being rotated (FIG. 15A) to rotationally engage them, much as detailed above with respect to alignment jig engagement arm shoulder portions 244. In contrast, however, a more robust cooperative snap-lock mechanism is implemented between one of the snap-locking protrusions 248 of the mounting plate 218, and a correspondinglyshaped structurally biased locking wedge 262 of the mount 226. As best illustrated through the cutout of FIG. 15B, the locking wedge 262 will snap into locking engagement with the snap-locking protrusion 248 upon fully rotating the mount 226 into place. In order to reverse the locking engagement, a tangential squeezing pressure is applied between a structurally biased release arm 264, which is rigidly formed to action the locking wedge 262, and a counterpressure arm 266, such that the squeezing action releases the locking wedge 262 from its engaged position with the snap-locking protrusion 248 and allows the mount to be twisted back out of mounted engagement.

As described above within the context of the illustrated embodiment, an alternative (improved) system and method for mounting a LoS sensor system on certain equipment has been provided. In one particular example, While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A line-of-sight (LoS) sensor mounting system for operatively mounting a LoS receiver and LoS transmitter on a structure having a first external wall and an opposed external wall, the system comprising:
    a mounting plate having a mounting plate LoS aperture defined therein dimensioned to correspond and align with a first external wall LoS aperture formed within the first external wall for secure mounting in relation thereto; and
    an alignment jig comprising a mounting plate engagement structure and an alignment barrel extending therefrom to define a LoS axis between the first external wall and the opposed external wall;
    wherein said alignment barrel is dimensioned to receive an aperture-forming tool operable therethrough along said LoS axis so to form a counterpart external wall LoS aperture within the opposed external wall such that the LoS receiver and the LoS transmitter can be operatively mounted in alignment with the first external wall LoS aperture and the counterpart external wall LoS aperture for operation along said LoS axis.

2. The system of claim 1, wherein, once engaged to said mounting plate, and prior to operation of said aperture-forming tool, an inward extension of said alignment barrel aligns secure mounting of said mounting plate to the first external wall in alignment with said first external wall LoS aperture.

3. The system of claim 1, wherein the first external wall and the opposed external wall define a material transfer channel, and wherein the LoS transmitter and the LoS receiver are operable to monitor a quantity of material transferred along said transfer channel, wherein said material transfer channel comprises an agricultural harvest transport channel.

4. The system of claim 3, wherein said agricultural harvest transport channel comprises a harvested grain transport channel, and wherein said quantity comprises an agricultural yield.

5. The system of claim 1, wherein said mounting plate comprises a cooperative engagement structure for reversibly engaging said mounting plate engagement structure of said alignment jig to thereby secure said alignment barrel in relation thereto.

6. The system of claim 5, wherein said cooperative engagement structure is further configured for structural engagement with one of the LoS transmitter or the LoS receiver so to, upon removal of said alignment jig, operatively mount said one of the LoS transmitter or the LoS receiver in alignment with the first external wall LoS aperture.

7. The system of claim 5, further comprising a transmitter mount structurally configured for cooperative engagement with said cooperative engagement structure of said mounting plate for structurally mounting the LoS transmitter to said mounting plate in alignment with said LoS axis.

8. The system of claim 7, wherein said transmitter mount cooperatively engages said cooperative engagement structure via a cooperative twist-lock structure.

9. The system of claim 7, wherein said transmitter mount is structurally configured for reversible cooperative engagement with said cooperative engagement structure of said mounting plate.

10. The system of claim 1, further comprising a counterpart mounting plate having a counterpart mounting plate LoS aperture defined therein dimensioned to correspond and align with said counterpart external wall LoS aperture once formed wherein, once engaged to said counterpart mounting plate, an inward extension of said alignment barrel aligns secure mounting of said counterpart mounting plate to the opposed external wall in alignment with said counterpart external wall LoS aperture.

11. The system of claim 10, wherein each of said mounting plate and said counterpart mounting plate comprises a cooperative engagement structure for reversibly engaging said mounting plate engagement structure of said alignment jig.

12. The system of claim 10, wherein the LoS transmitter is securely engageable to said mounting plate in alignment with said LoS axis, whereas the LoS receiver is securely engageable to said counterpart mounting plate for exposure to LoS transmissions along said LoS axis.

13. The system of claim 10, wherein each of said mounting plate and said counterpart mounting plate comprises a cooperative engagement structure for securely engaging a respective one of the LoS transmitter or the LoS receiver in operative alignment.

14. The system of claim 13, further comprising a transmitter mount and a receiver mount, each structurally configured for cooperative engagement with said cooperative engagement structure to structurally secure the LoS transmitter and the LoS receiver thereto, respectively.

15. The system of claim 14, wherein said transmitter mount and said receiver mount cooperatively engage said cooperative engagement structure via a cooperative twist-lock structure.

16. A line-of-sight (LoS) sensor mounting method for operatively mounting a LoS receiver and LoS transmitter on a structure having a first external wall and an opposed external wall, the method comprising:
  securing a mounting plate having a mounting plate LoS aperture defined therein to the first external wall in alignment with a first LoS aperture;
  engaging an alignment jig with said mounting plate such that an alignment barrel thereof defines a LoS axis from the first LoS aperture;
  operating an aperture-forming tool through said alignment barrel along said axis to form a counterpart LoS aperture in the opposed external wall;
  disengaging said alignment jig from said mounting plate; and
  mounting the LoS transmitter and the LoS receiver in relation to said first LoS aperture and said counterpart LoS aperture in alignment with said LoS axis.

17. The method of claim 16, wherein said securing comprises adhering via an adhesive.

18. The method of claim 16, wherein the method further comprises disengaging said alignment jig from said mounting plate; and wherein one of the LoS transmitter or the LoS receiver is mounted via said mounting plate.

19. The method of claim 16, wherein, prior to securing said mounting plate, the method further comprises forming the first LoS aperture in the first external wall.

20. The method of claim 16, wherein said alignment jig is engaged with said mounting plate prior to said securing so to guide alignment thereof with the first LoS aperture during said securing.

21. The method of claim 16, wherein, after said disengaging, the method further comprises:
  engaging said alignment jig with a counterpart mounting plate;
    using guidance from said alignment jig, securing said counterpart mounting plate to the opposed external wall in alignment with said counterpart LoS aperture; and
    disengaging said alignment jig from said counterpart mounting plate;
    wherein the other one of the LoS receiver or the LoS transmitter is mounted via said counterpart mounting plate.

22. The method of claim 21, wherein the LoS transmitter is securely mounted relative to the first LoS aperture via said mounting plate, whereas the LoS receiver is securely mounted relative to the counterpart LoS aperture via said counterpart mounting plate.

23. The method of claim 22, where each of the LoS transmitter and the LoS receiver are securely mounted via a secure twist lock mechanism.

* * * * *